UNITED STATES PATENT OFFICE.

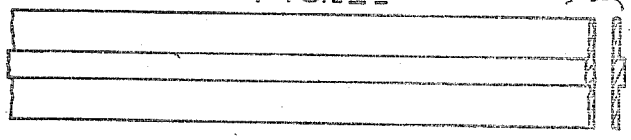
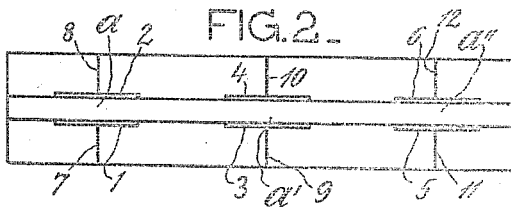
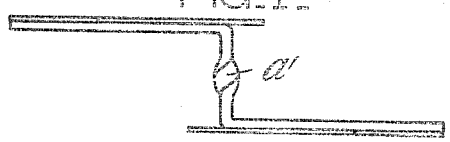
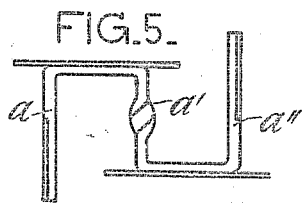
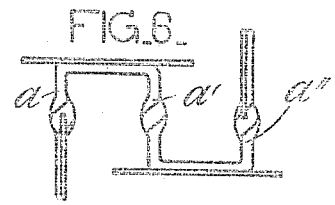
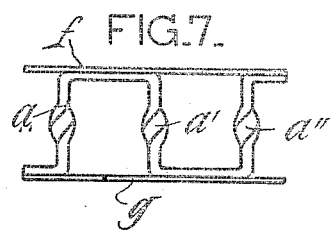
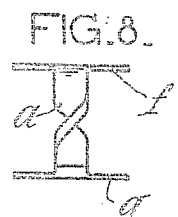

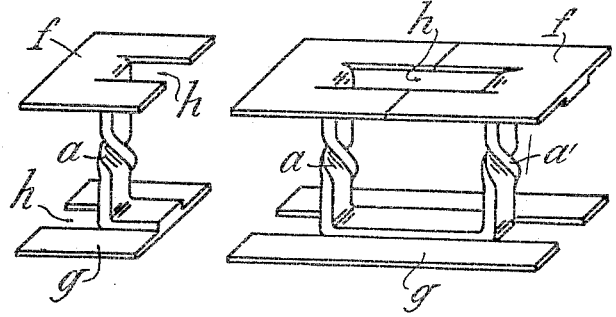
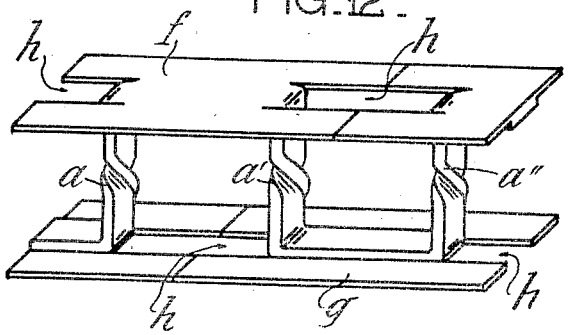
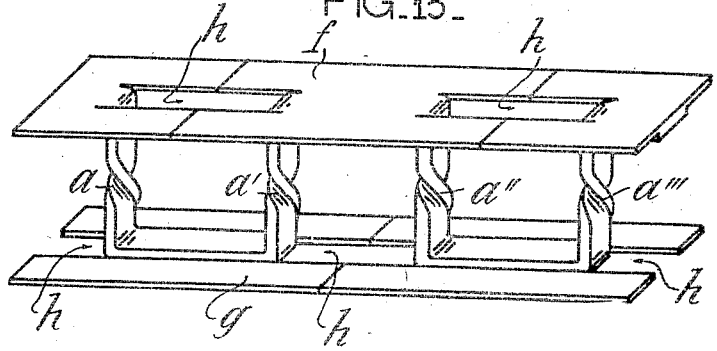

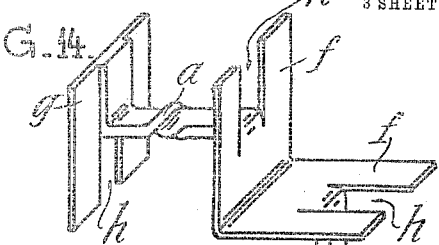
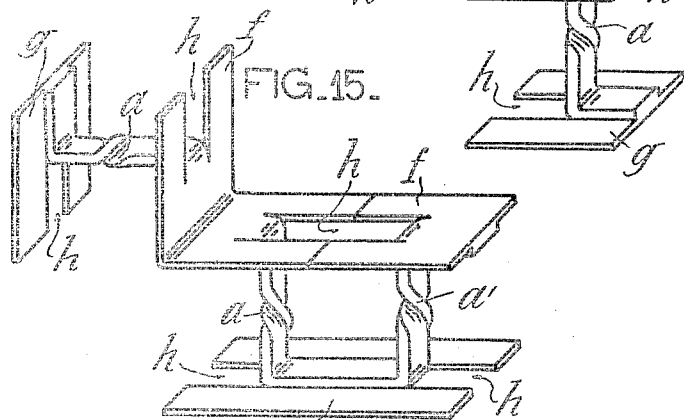
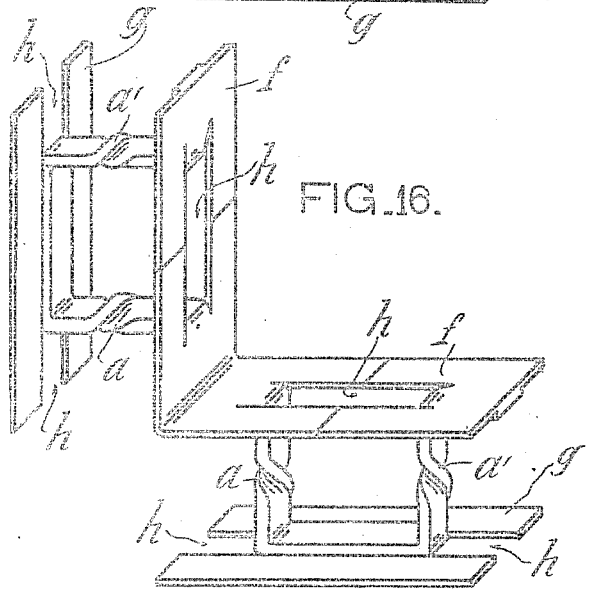

HEINRICH SONNET, OF MOSCOW, RUSSIA.

CORE-SUPPORT.

1,099,672.  Specification of Letters Patent.  Patented June 9, 1914.

Application filed October 1, 1912. Serial No. 723,444.

*To all whom it may concern:*

Be it known that I, HEINRICH SONNET, engineer, a subject of the Emperor of Germany, residing at Alexandro-Newski Per. No. 5, Moscow, Empire of Russia, have invented new and useful Improvements in Core-Supports, of which the following is a specification.

The invention relates to that kind of core supports in which the bearing plates with the connecting stays consist of one piece of sheet iron with longitudinal rib, while each connecting stay is formed of the rib of the blank detached from the plate and bent back. In these core supports the bending back of the rib forming the bridge can only be effected in the same direction, so that in the finished support the ribs run the one opposite the other on the supporting plates. Consequently the holes resulting in the supporting plates from the detaching of the rib to form the bridge are opposite, hence are only present on one side of the bridge, so that effective escape of the air is impossible on the other side of the bridge and therefore there is a possibility of the formation of bubbles. In addition the necessity of always bending back in the same direction the rib forming the bridge does not permit of making core supports with more than two bridges. That is a serious disadvantage, because practice requires core supports of any desired length and with the larger lengths a correspondingly increased number of bridges can be obtained. Both disadvantages of the said kind of core supports are overcome by the invention by the fact that the bridges, formed out of the rib by detaching from the sheet iron and by bending back, are twisted about their longitudinal axes. In this way is obtained, with core supports with one bridge as well as with several bridges, alternate holes of the supporting plate, so that care is taken for proper escape of the air at each side of the bridge and the formation of bubbles is avoided thereby. To this is added the greater resistance of the twisted bridge against compression and its easier welding in. At the same time the desired increase in the number of bridges and hence the desired prolongation of the core support as well as the making of corner supports with any desired number of bridges is accomplished.

Straight and angled core supports constructed according to my invention and having one, two or more stays are illustrated by way of examples in the accompanying drawings in which:—

Figures 1 to 9 illustrate the manufacture of a core support having three stays. Fig. 1 shows in underside view and in cross section the core support blank consisting of a piece of flat bar iron having a central longitudinal rib. Fig. 2 shows the separation of the portions of the rib for forming the stays from the flat bar iron and the division of the flat bar iron by cuts 1, 2, 3, 4, 5, 6, 7, 8, 9, 10, 11, and 12. Figs. 3 to 9 illustrate the manufacture of the straight core support with three stays from the blank prepared as shown in Fig. 2. Figs. 10 to 16 are diagrammatic or perspective views. Figs. 10 to 13 show straight core supports having one, two and more stays. Figs. 14, 15 and 16 show angled core supports.

In the manufacture of a straight core support having for instance three stays, prepared from a blank as shown in Fig. 2, the central detached rib portion $a'$ is first bent twice in a right angle. In this manner the structure shown in Fig. 3 is produced. The stay $a'$ is now turned at an angle of 180° about its own axis (Fig. 4). Then the other two detached rib portions $a$ and $a''$ are bent over in a right angle (Fig. 5), and then turned at an angle of 180° on their longitudinal axis (Fig. 6) and then bent again in a right angle toward the center. In this manner a structure is produced which is shown in side elevation in Fig. 7, in front elevation in Fig. 8, and in plan Fig. 9. This structure constitutes a core support having three stays and the mutually facing bearing plates $f$ and $g$. The remaining figures are diagrammatic. In these figures Fig. 10 shows a straight core support having one stay, Fig. 11 shows a support with two stays, Fig. 12 a support with three stays, and Fig. 13 a support with four stays. Figs. 14 to 16, show core supports of angular shape, Fig. 14 showing a support with one stay between each pair of bearing plates, Fig. 15 a support with one stay between one pair, and two stays between the other pair of bearing plates, and Fig. 16 a support having two stays between each pair of bearing plates. In the core supports shown in these figures, each stay $a\ a'\ a''\ a'''$ is twisted at an angle of 180° on its longitudinal axis, so that the imperforate portion of the surface of one of the pairs of mutually facing bearing plates or bearing plate parts $f$ and $g$ is situated opposite to the aperture $h$ of the other plate or plate portion of the same pair of bearing plates. Each stay $a$ is therefore provided on each side with an aperture $h$ in one of the bearing plates or bearing plate portions so that the air can escape on each side of the stay.

Having now particularly described and ascertained the nature of my said invention and in what manner the same is to be performed, I declare that what I claim is:—

1. A core support comprising spaced bearing plates having longitudinal ribs on their inner faces and connecting stays connecting the plates, each stay being a bent up portion of said rib and plate cut from the plate, bent at right angles and twisted.

2. A core support comprising spaced bearing plates having longitudinal ribs on their inner faces and connecting stays connecting the plates, each stay being a bent up portion of said rib and plate cut from the plate, bent at right angles and twisted whereby openings in the plates are left on opposite sides of the stays.

3. A core support comprising spaced bearing plates and connecting stays connecting the bearing plates, said plates being provided with openings adjacent to the stays and on opposite sides of the stays.

4. A core support comprising two spaced series of bearing plates arranged end for end, and stays connecting oppositely disposed bearing plates, each bearing plate being provided with an opening from which the connecting stay was cut and adjacent to such stay.

5. A core support comprising two spaced series of bearing plates arranged end for end, and stays connecting oppositely disposed bearing plates, each bearing plate being provided with an opening from which the connecting stay was cut and adjacent to such stay the openings adjacent each stay being on opposite sides of the stay.

6. A one piece core support comprising two series of bearing plates arranged end for end, the series being spaced from each other, each plate having a rib on its inner face; and connecting stays connecting the plates and cut from the plates and ribs and twisted.

7. A core support comprising spaced bearing plates having longitudinal ribs on their inner faces and connecting stays connecting the plates, each stay being a portion of said rib and plate cut from the plate, bent up and twisted.

8. A core support comprising spaced bearing plates having longitudinal ribs on their inner faces and connecting stays connecting the plates, each stay being a bent up portion of said rib and plate cut from the plate, bent at right angles and twisted through 180 degrees only.

9. A one piece core support comprising two series of more than two bearing plates arranged end for end, the series being spaced from each other, each plate having a rib on its inner face; and more than two connecting stays connecting the plates and cut from the plates and ribs and twisted.

In testimony whereof I have signed my name to this specification in the presence of two subscribing witnesses.

HEINRICH SONNET

Witnesses:
 CHR. EUFURT,
 L. RÖLL.